A. L. PARKER.
CONTROL SYSTEM FOR AUTOMOBILES.
APPLICATION FILED AUG. 21, 1914.

1,268,764.

Patented June 4, 1918.
3 SHEETS—SHEET 1.

Witnesses.
S. W. Brainard.
W. H. Percy.

Inventor
Arthur L. Parker
By Hull and Smith
Attorneys.

UNITED STATES PATENT OFFICE.

ARTHUR L. PARKER, OF CLEVELAND, OHIO.

CONTROL SYSTEM FOR AUTOMOBILES.

1,268,764.

Specification of Letters Patent.

Patented June 4, 1918.

Application filed August 21, 1914. Serial No. 857,827.

*To all whom it may concern:*

Be it known that I, ARTHUR L. PARKER, a citizen of the United States, residing at Cleveland, in the county of Cuyahoga and State of Ohio, have invented a certain new and useful Improvement in Control Systems for Automobiles, of which the following is a full, clear, and exact description, reference being had to the accompanying drawings.

This invention relates to systems for controlling automobiles. The system disclosed herein is designed with particular reference to the use of a pressure fluid, such as compressed air, as the motive power for performing the usual manual operation of starting the engine; engaging and disengaging the clutch; shifting the gears for the purpose of changing the gear ratio between the engine shaft and the driving shaft, and reversing the direction of driving the automobile; applying the service brakes, and of applying a brake to the driven clutch member.

It is the general object of the invention to provide a system of control which is particularly adapted for use with and by fluid under pressure; also to provide a system of this character wherein a definite sequence in the operations of the gear shifting mechanism, brake applying and releasing mechanism, and clutch engaging and disengaging mechanism is realized, thereby to simplify the control of an automobile and to obtain a maximum speed, accuracy and efficiency in performing the various operations mentioned above and also to prevent injury to the various mechanisms such, for instance, as the stripping of any of the reversing and speed changing gears. A further object which is secured through the invention (and which is incidental to the employment of a pressure fluid as the operating means) is to provide a system which is particularly flexible and one which eliminates the jars of impact between the aforesaid gears and which possesses an inherent cushioning function—due to the use of the compressible operating fluid. A further object of the invention is to provide a system of the character referred to wherein the operating fluid may be gradually admitted to and exhausted from the various operating mechanisms—which contributes to the flexibility referred to hereinbefore and which is exceedingly sensitive to the control of the operator, enabling him to "feel" the operation of the movable parts; and this, in the case of gear shifting is particularly important since it enables the operator to prevent the sudden impact and attendant danger of stripping the gears.

It is a further object of the invention to provide means whereby, in a system in which pressure fluid is employed for starting purposes as well as for operating the mechanisms referred to hereinbefore, it will be impossible to start the engine without first disengaging the clutch members, the same being automatically accomplished through the starting operation. It is a further object of the invention to render the automobile absolutely safe should there be any break or failure in the control system.

It is a still further object of the invention, in the event that pressure fluid is employed for starting the engine, to provide a plurality of storage compartments in certain of which a reserve of the pressure fluid is retained which will be available for speed-control purposes, should the main storage compartment become exhausted through the starting of the engine, or within a short time thereafter through the initial operation of the speed-control mechanisms.

The mechanisms required to perform the operations above referred to may be constructed as described and illustrated hereinafter. These mechanisms comprise, generally, an engine, a compressed air motor for starting the engine, an air compressor pump that is driven by the engine, and a plurality of intercommunicating pressure fluid storage tanks (the purpose of employing a plurality of tanks being explained hereinafter) with suitable pipes leading therefrom to gear shifting cylinders and to a combined clutch and brake shifting cylinder; also a selecting valve for the gear shifting mechanism and a distributing valve which controls the distribution of air from the tanks to the selecting valve and therefrom to the gear shifting cylinders or to the cylinder from which the brake and the clutch are operated. It is contemplated that a power driven starting device for the engine will be employed, as hereinbefore mentioned, and, for this purpose, I have indicated a compressed air motor which may be supplied from the storage tanks. The aforesaid distributer valve insures the proper sequence of shifts in the operation of the various controlling mechanisms; that is to say, through the use of this valve the connections between the same and the gear shift selecting valve, and the brake and clutch operating cylinder, it will be impossible to shift the gears without having first released the clutch; to apply the brake without having first released the clutch; or to operate the clutch without having released the brake.

In the system illustrated herein, what I will term a primary valve is interposed between the main distributer valve and the storage tanks, which valve, when in one position, will cut off all power from the control mechanism and relieve the pressure in all cylinders in the control system, as well as from the engine starting device, whereby it may be locked in this (neutral) position, through any approved means, and the engine cannot be started. When the valve is turned to another position, without effecting the control mechanism in any way, it directs the air into the compressed air motor to start the engine; when in still another position (which is reached by swinging the valve in the reverse direction through neutral position) the supply to the compressed air motor or engine starting device is cut off and the pressure fluid is directed, through the aforesaid distributing valve, into the control mechanism.

A further and very important point of advantage which is secured in and through the use of my system is the fact that the clutch members are held in engagement by the pressure fluid whereby, should there be any break in the control system or any undue leakage, the clutch members will be disengaged and no possible injury can result through such break or failure in the system. It will be evidently impossible for the operator to lose control of his machine through such failure in the system. When the operator desires to run the engine idly, and leave the driver's seat for any purpose, such as engine adjustment, the clutch and control mechanisms may be "disconnected" or rendered ineffective by turning the primary valve, above mentioned, to neutral position, thus insuring safety against accidental starting of the automobile. Further advantages derived from the use of my system will become apparent in the course of the following description.

In the accompanying drawings I have shown, conventionally, an Overland make of automobile, Model 79—1914, in connection with which I have illustrated an embodiment of my invention. Referring now to the drawings.

For the sake of clearness, I have deemed it advisable to omit from the drawings such parts as the supporting brackets for the various elements of the system, air accumulators, valves which are unessential to a successful operation of the system, and the like, and which would naturally be supplied by any one skilled in the art to which this invention pertains.

I will first describe the system in a general way, referring to the various elements by the use of reference letters, and explain their coöperation with the respective mechanisms of the automobile with which they are associated and which they actuate or control; and I will then describe, in detail, and by the use of reference numerals, the various essential elements which are peculiar to the system.

Figure 1:
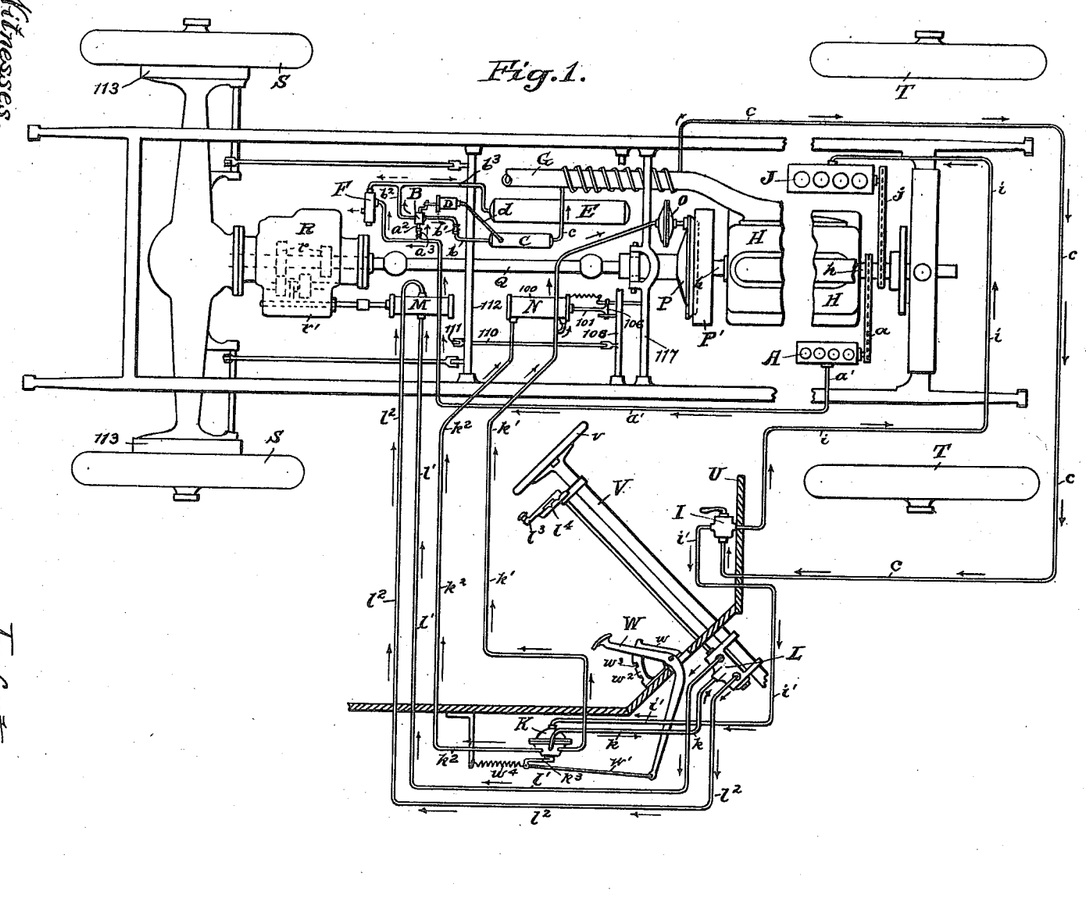
Figure 1 is a diagrammatic representation of an automobile of the aforesaid make having my control system applied thereto (the chassis of the automobile being shown in plan while certain of the parts are shown as removed therefrom and in sectional side elevation)

A represents an air pump (which may be of any approved type) and which is driven, through sprockets and chain $a$, from the engine shaft. The air is conducted from the pump A, through the tubes $a'$ and $a^2$, and through the valve B and tube $b$, to a pressure fluid storage tank C, check valves $b'$ and $a^3$ (of ordinary type) being included in the tubes $b$ and $a^2$ respectively, to prevent the flow of fluid from the tank C through the valve B, or from the tank E (to be described later) through the tubes $b^3$, $b^2$, the valve B, and through the end portion of the tube $a'$, to the automatic "cut-out" valve F, presently to be described. D represents a cylinder which also has connection, through the tube $d$, with the tank C. A piston is held, by a spring, as will be explained more fully hereinafter, against that end of the cylinder D wherewith the tube $d$ is connected. The rod of the piston has connection with the stem of the valve B whereby, when the piston is moved against the tension of the aforesaid spring, by the pressure fluid from the tank C, said rod will operate the valve B (when the pressure in the tank C has reached a predetermined point) to cause said valve to direct the flow of air to both the tubes $b$ and $b^2$, the latter having connection with a tube $b^3$ that leads to an auxiliary storage tank E. The valve will remain in a position to direct the fluid from the pump A to the auxiliary tank E, the check valve $b'$ preventing the flow of fluid from the tank C to the tank E until the pressure in the latter equals the pressure in the former. Thereafter the pressure in both tanks C and E will rise sufficiently high to throw the valve still farther, so that supply to the tank C is cut off and all of the air from the pump A is conducted into the tank E. As will be presently described, the tank E will serve to restore the tank C, when the same becomes exhausted, said tank serving, further, as a receptacle for the storage of pressure fluid in sufficient quantity for engine starting purposes.

F represents a "cut-out" valve, to be presently described in detail, which is actuated by pressure fluid from the auxiliary tank E, against the tension of a spring, to cause the air pump to exhaust into the atmosphere, when the fluid within the auxiliary tank has reached a predetermined pressure.

The air is led from the tank C, through a tube $c$, that is coiled for a portion of its length, about the exhaust pipe G of the engine H to the primary valve I. The reason for the tube $c$ making a number of convolutions about the exhaust pipe G is that the heat which is radiated from the exhaust pipe G will raise the temperature of the air within the tube $c$ and thereby expand it and increase its efficiency and prevent undue cooling and ice formation in the passages, in cold weather. From the primary valve I, the air may be turned through the tube $i$, to the compressed air motor $j$, for starting the engine, the shaft of the air motor being connected, through suitable sprockets and the chain $j$, to the engine shaft $h$.

By turning the valve I in the reverse direction, the pressure fluid may be caused to flow through the tube $i'$ to the distributer valve K. From the distributer valve, the air may be conducted, through a tube $k$, to the selecting valve L and thence, through the tubes $l'$, $l^2$ to either of a pair of gear shifting cylinders M; or it may be conducted, through the tube $k'$, to the forward end of the clutch and brake operating cylinder N, for actuating the service brake of the automobile; or, further, to a suitable diaphragm casing O, which controls the clutch brake for stopping the rotation of the driven clutch member, when the same is free from the driving member; or the pressure fluid may be conducted through the tube $k^2$, to the opposite end of the cylinder N, to cause it to release the brakes and to engage the clutch members, as will be described in detail hereinafter.

The driven and driving clutch members are shown generally at P, P', respectively, the latter having rigid connection with the end of the engine shaft $h$, and the former being slidably but non-rotatably mounted upon the forward end of the shaft Q (in a manner common in automobile construction). R represents the gear box or casing within which are contained the usual change-of-speed and reversing gears, some of which are shown in a general way in dotted lines, and designated $r$. Through these gears, the power is transmitted from the shaft Q to the rear wheels S of the automobile. The front or steering wheels of the automobile are represented at F.

The primary valve I is preferably supported by the dash board U, in convenient reach of the driver, and I have illustrated the selecting valve L as being carried by the steering column V, and as being operated by a handle $l^3$ that is associated with a sector $l^4$, supported by the steering column and in juxtaposition to the steering wheel V. This arrangement may be altered, however, by placing the valve L beyond the end of the steering column and the operating handle $l^3$ above the steering wheel, and connecting them by a rod which extends longitudinally through the column, in a common and well known manner. A lever W is pivoted to a bracket $w$ that is supported upon the floor of the automobile in easy reach of the driver's foot, and one end of the lever W projects downward through a slot in the floor and has connection, through the link $w'$, with the operating lever $k^3$ of the distributing valve K. Incorporated in the bracket $w$ is a sector $w^2$ which is provided with a series of notches $w^3$ wherewith the adjacent portion of the lever W may coöperate in order to enable the driver to determine the various positions of the valve K. A spring $w^4$ tends toward holding the valve K in normal position.

Figures 2, 3, 4, 5, 6, 7, 8:
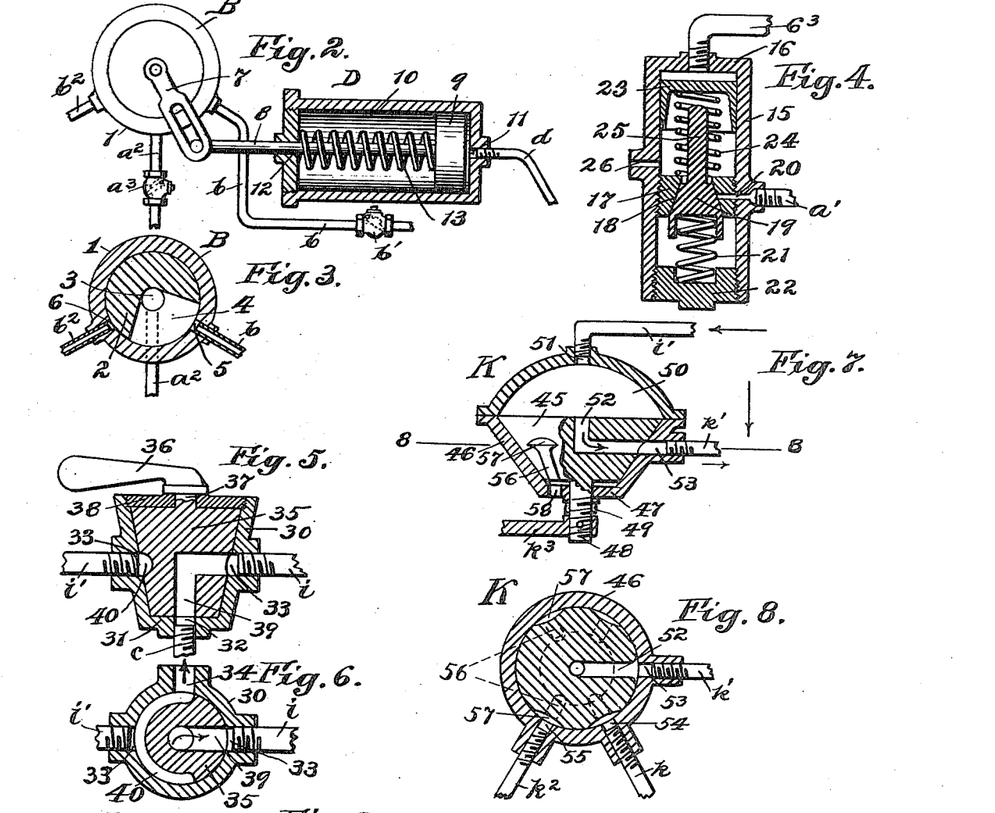
Fig. 2 is a detail of a valve and a pressure fluid operating means therefor, the cylinder through which the valve is operated being shown in section.
Fig. 3 is a sectional detail of the valve shown in Fig. 2.
Fig. 4 is a section through the automatic cut-out device for the air pump.
Figs. 5 and 6 are sectional details, at right angles to each other, of the primary valve.
Fig. 7 is a vertical section through the distributer valve.
Fig. 8 is a horizontal section through the distributer valve.

I will now describe in detail the valve B, and the cylinder whereby said valve is actuated, referring, in such description, to Figs. 2 and 3. Within the casing 1 is adapted to oscillate the cylindrical valve body 2 which has a central, vertical port 3 extending upward from its bottom to where it joins the inner end of a radial, segmental port 4 that extends to the periphery of the valve body. Located in the same horizontal plane as the port 4, are a pair of ports 5 and 6 that are formed in the wall of the casing, and which are arranged to register with the port 4 of the valve body, when the latter is turned at a proper angle. Attention is here directed to the fact that the angular extent of the port 4 is sufficient to enable it to simultaneously register with both ports 5 and 6, in order that the previously described operation of the valve may be accomplished. There is also a port through the bottom of the casing which registers with the lower end of the port 3 and with which is connected the tube $a^2$. The tubes $b$ and $b^2$ connect, respectively, with the ports 5 and 6. An operating arm 7 has rigid connection with the valve body 2, and this arm is operatively connected to the end of a rod 8 of the piston 9, which is adapted to reciprocate within the cylinder 10. One end of the cylinder has a port 11, with which is connected the tube $d$. The opposite end of the cylinder is closed by a head 12, and between this head and the piston, there is interposed a spring 13 which acts to hold the piston 9 against the end of the cylinder having the port 11, and in a position to retain the valve B in a condition to supply air, through the tube $b$ to the storage tank C. It will be seen, therefore, that when the pressure within the tank C becomes great enough to move the piston 9, against the tension of the spring 13, a certain distance toward the opposite end of the cylinder 10, the valve body 2 will be oscillated to cause it to establish communication between the tube $a^2$ and both tubes $b$ and $b^2$ and cause the air from the pump A to be directed into both tanks C and E until the pressure is raised sufficiently to move the piston 9 still farther to the left and cause it to turn the valve B so that communication to tank C is suspended while the auxiliary tank E is fully stored. This construction will be recognized as providing a very prompt means of restoring the smaller tank C from the auxiliary tank E, when the pressure in the former falls enough to result in the valve B being returned to intermediate position.

The automatic "cutout" valve that is shown in Fig. 4, comprises a cylindrical casing 15, having a closed end 16 wherewith is connected the end of the tube $b^3$, remote from that end which has connection with the auxiliary tank E. Intermediate the open and closed ends of the casing 15 there is a partition 17 which has a conical seat 18 for coöperation with the correspondingly shaped valve body 19. A port 20 extends through the wall 15 and through the partition 17, within the zone of the tapered seat 18. This port has connection, through the tube $a'$, with the air pump A; and it is obvious, because of the very slight area of the port 20, and the fact that its open end is presented to the tapered portion of the valve body 19, that the pressure of the fluid from the pump will have no effect upon unseating the valve 19 against the tension of the spring 21 which is interposed between the end of the valve body and the cap 22, which closes the end of the casing 15. Within the opposite end of the casing 15 there is adapted to reciprocate a piston 23, and this piston is normally held against the end 16 of the casing by a spring 24. A stem 25 projects from the valve body 19 toward the closed end of the casing, and is adapted to be engaged by the piston 23 when the same is moved, by the accumulation of pressure fluid within the upper end of the casing, against the tension of the spring 24. It will be clear that the strength of the spring 24 and the distance of movement of the piston 23 before it engages the stem 25, combine to determine the degree of pressure within the auxiliary tank required to unseat the valve 19 to allow the pressure fluid from the pump to enter the compartment of the casing which contains the piston 23 and escape therefrom into the atmosphere through the port 26, that is formed in the side wall of the casing. It may be stated at this time, that the automatic "cut out" valve is so regulated, with respect to the tension of the spring within the cylinder D, that the pressure within the auxiliary tank E will be considerably in excess of the pressure of the fluid contained within the tank C, when the fluid within the auxiliary tank has reached a pressure sufficient to actuate the "cut out" valve.

The primary valve, which is illustrated in Figs. 5 and 6, comprises a cylindrical casing 30, having a closed bottom 31, through which an admission port 32 extends and with which connects the end of the tube $c$, that leads from the storage tank C. Connecting, at diametrically opposite points, with the sides of the casing 30, are the tubes $i$ and $i'$. The ports 33 with which these tubes connect are in the same transverse plane, and an exhaust port 34 opens through the wall of the casing, in the same plane as the ports 33. The valve body 35 is adapted to be rotated within the casing, by a handle 36 which is pinned to the shank 37 of said valve body, said shank projecting through an aperture in a cover 38 which is threaded into the upper end of the casing 30. The valve body has a central port which extends upwardly from its lower end and which registers with the inlet port 32 of the casing, and this port has a lateral extension which opens through the side of the valve body in a plane with the ports 33 and 34. A groove 40 extends circumferentially about the valve body 35 and through substantially 180°. From the foregoing it will be seen that when the valve is turned in the position shown in the drawings, air will be conducted from the tank C, through the tube $c$, and thence through the port 39 of the valve, to the tube $i$, which leads to the air motor J, for starting the engine. When the valve body is returned through substantially 180°, the port 39 will register with the tube $i'$ and air will be conducted to the distributer valve K, to be used for operating the control mechanism. At the same time the tube $i$ will be opened to the atmosphere through the groove 40 which will then register with that port 33 which forms the termination of the tube $i$, and the exhaust 34. By turning the valve to intermediate position, the pressure fluid supply will be cut off from either the engine starting device or the control mechanism and both will be opened to the atmosphere through the groove 40 and the ports 33 and 34.

The distributer valve K is illustrated in detail in Figs. 7 and 8. This valve comprises a frusto-conical valve body 45 which is received by a correspondingly shaped casing 46 through the bottom 47 of which projects the stem 48 of the valve body 45. The valve body is held against its tapered seat by a nut 49 that is applied to the threaded stem 48, and beyond this nut, the stem has pinned to it an operating arm $k^3$. The upper end of the casing is closed by a dome-shaped cover 50 that has a central admission port 51 wherewith the tube $i'$ is connected. The valve body 45 has a central port 52 which extends downwardly from its upper surface part way through the valve body to where it is turned laterally and opens through the tapered side of the valve body in the plane of the ports 53, 54 and 55 in the valve casing. These ports are connected, respectively, with the tubes $k'$, $k$ and $k^2$. The periphery of the valve body 45 is provided with a series of vertical grooves 56 which have enlarged upper ends 57 that are in the plane of the ports 53, 54 and 55. It will be noted that these grooves 56 extend to the bottom of the valve casing, which portion of the casing is opened to the atmosphere through the port 58. Attention is directed to the fact that the enlarged upper ends 57 of the grooves 56, as well as the discharge end of the port 52, are gradually tapered and reduced in cross sectional area toward their ends, for a purpose which will become apparent further along in this description. When the valve is in the position shown in the drawings, pressure fluid will be conducted to the tube $k'$, at the same time permitting any air which may be present within the tubes $k$ and $k^2$ (and the elements wherewith they connect) to be exhausted through those grooves 56 which are in register with the ports 54 and 55, at the time the port 52 is in register with the tube $k'$. When the operator wishes to charge either of the other tubes $k$ or $k^2$, with the pressure fluid, he turns the valve so as to bring the port 52 into register with the ports that have connection with the tube desired, and the remaining tubes will first be discharged through their respective grooves 56 to the bottom of the casing and thence to the atmosphere through the port 58.

Figure 12:
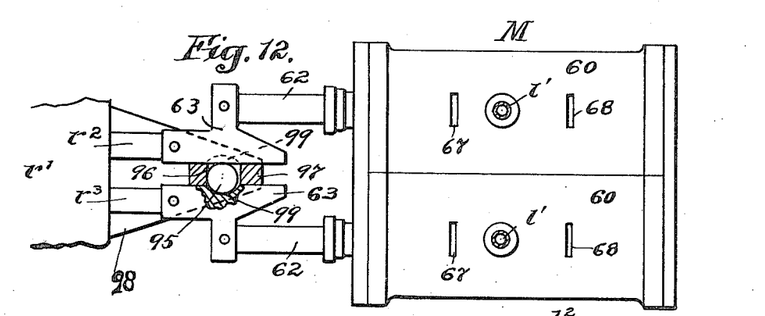
Fig. 12 is a side elevation of the gear shifting cylinders.
Figure 13:
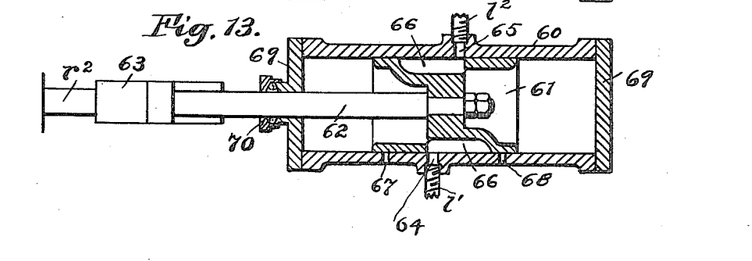
Fig. 13 is a horizontal, longitudinal section through one of the gear shifting cylinders.

The cylinders through which the gear shifting is accomplished, and which are shown at M in Fig. 1, are illustrated in detail in Figs. 12 and 13. Referring to Fig. 1, it may be stated that the gearing which is contained within the box or casing R is constructed and arranged with the object in view of changing the relative direction of rotation, and speed of the driving shaft Q, and the shaft which extends through the rear axle of the automobile and which carries the driving wheels S. The arrangement of the gearing may, therefore, be that of a number of well known makes of automobiles, it being understood that the change of direction or speed is accomplished by the sliding of certain gears. Reciprocably mounted within an extension $r'$ of the box or casing R, are a pair of bars $r^2$ and $r^3$ which, when reciprocated, will slide certain gears within the casing. Ordinarily these rods are shifted by means of a hand lever, suitable connections being provided between said lever and the bars $r^2$ and $r^3$. In my improved system, I substitute for the manually operated lever and the connections between it and the bars $r^2$ and $r^3$, the cylinders M, with connections between their respective pistons and the aforesaid bars.

The cylinders are identical, and a clear understanding of both may be gained from a description of one. Both cylinders 60 may be formed of an integral casting, and each contains a piston 61, the rod 62 of which has its outer end connected to a head 63 that, in turn, is pinned to the end of one of the aforesaid bars.

The side walls of each of the cylinders 60 contain ports 64 and 65, which are located at substantially the longitudinal center of the cylinder, and with the former of these ports is connected the tube $l'$, the tubes $l^2$ having connection with the port 65. These ports are arranged diametrically opposite each other, and the piston 61 has an elongated port 66 which is adapted to register with the aforesaid ports 64 and 65. A pair of exhaust ports 67 and 68 are formed in the side wall of each of the cylinders, in a position to be covered by the piston 61, when the same is in central position. The ends of the cylinders are closed by suitable heads 69, and the head through which the rod 62 projects is fitted with the usual packing gland 70.

When, by the use of the selecting valves L (next to be described) compressed air is directed through the tubes $l'$, the air will be caused to pass to the left hand end of the cylinder 60. Almost immediately upon the admission of the air, the piston 61 is moved toward the opposite end of the cylinder, and the supply of air is thereupon cut off by the piston covering the port 64. In the meanwhile, the air which is on the opposite side of the piston is being exhausted through the ports 66 and 65, and the tube $l^2$. This movement of the piston continues until the fluid confined within the left hand end of the cylinder is liberated through the exhaust ports 67, whereupon further movement of the piston is stopped. When it is desired to move the piston to the left hand end of the cylinder, assuming that the piston is in the middle of the cylinder as shown in the drawings, the aforesaid operation is reversed by admitting the air through the tubes $l^2$ and port 65 into the right hand end of the cylinder, the air on the left hand end of the piston being exhausted through the port 64 and tube $l'$. Let it be considered, however, that the piston has been left at the right hand end of the cylinder, after the operation first described. Now upon the admission of air through the tube $l^2$, the port 65, and the adjacent port 66, the air will be conducted to the right hand end of the cylinder, and, under the influence of the accumulating pressure fluid therewithin, the piston will be moved to the left until the admission port 65 is closed by the piston. Now, further movement of the piston toward the left will be effected by the expansion of the fluid confined in the right hand end of the cylinder, and this movement will continue until the confined fluid is permitted to escape through the exhaust ports 68. To return the piston to central or neutral position, pressure fluid is admitted through both tubes $l'$ and $l^2$, and accumulates on both sides of the piston, thereby equalizing the pressure in both ends of the cylinder and centraling the piston. These various operations are accomplished through the manipulation of the selecting valve which will now be described.

Figure 9:
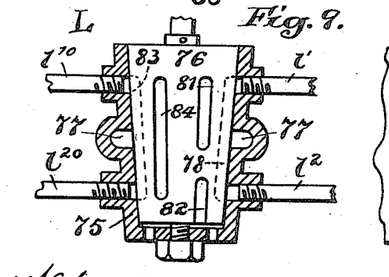
Figs. 9 and 10 are a vertical section through the selecting valve, and a development of the selecting valve body, respectively.
Figure 10:
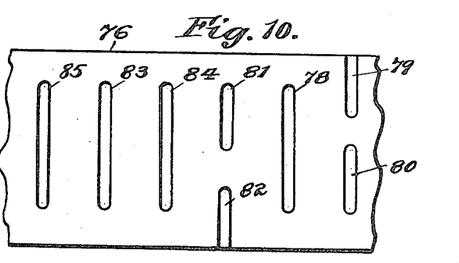

In Fig. 9 I have shown a central vertical section through the selecting valve L, and in Fig. 10 a development of the body thereof. The valve is shown as comprising a casing 75 within which is adapted to rotate a valve body 76. The casing has formed within one of its sides, a pair of ports with which connect the tubes $l'$ and $l^2$, and diametrically opposite these ports, are similar ports with which connect the tubes $l^{10}$ and $l^{20}$. These tubes correspond to the tubes $l'$ and $l^2$, but lead to the lower of the cylinders M. Intermediate the plane of the upper and lower tubes, the casing has formed within its wall, a passageway which extends substantially half way about its circumference and opens at each end, into the casing in vertical alinement with one of the upper and one of the lower ports aforesaid.

As will be seen most clearly from the development shown in Fig. 10, the valve body 76 is provided with vertically disposed grooves, which are spaced substantially 60° apart about its circumference. I will first refer to the one designated 78 which extends from the plane of the upper ports of the valve casing, to the plane of the lower ports thereof, the same including in its extent, of course, the passageway 77 wherewith the tube $k$ is connected. On one side of the groove 78 is located a pair of vertically disposed grooves 79 and 80, the upper of which is adapted to register with either of the upper ports of the casing, and thereby throw it into communication with the atmosphere because of the fact that the upper end of the groove 79 opens through the top of the valve body; while the lower grooves 80 will throw into communication one end of the passageway 77 with the corresponding lower port of the casing. Spaced in the opposite direction from the groove 78, there is a pair of grooves 81 and 82 through which communication may be established between the passageway 77 and either of the upper ports of the casing, and whereby either of the lower ports of the casing may be opened to the atmosphere, through the perforated bottom of the casing. Diametrically opposite the groove 78, is a similar groove 83. Also opposite the pair of grooves 79 and 80, is a groove 84, similar to the groove 83. And a like groove 85 is located diametrically opposite the pair of grooves 81 and 82. When the valve body is in a position to bring the grooves 78 into alinement with the tubes $l'$ and $l^2$, and one end of the passageway 77, the groove 83 will register with the tubes $l^{10}$ and $l^{20}$, and the opposite end of the passageway 77. Hence, when pressure fluid is directed through the tube $k$, it will be distributed evenly throughout all of the tubes leading from the selecting valve L, and through these tubes, into the opposite ends of the gear shifting cylinders M, to centralize their pistons. To shift the piston within the upper cylinder M to the right, the valve body 76 is turned so that the groove 81 will bridge the end of the passageway 77 and the port wherewith the tube $l'$ connects. The operation previously described in connection with the gear shifting cylinders M, will take place, the air from the end of the cylinder toward which the piston is moving, being exhausted through the tubes $l^2$ and the groove 82 in the valve body. To shift the piston to the opposite end of the cylinder, the valve body 76 is rotated in the opposite direction, or to the left, to bring the grooves 79 and 80 into register with the tubes $l'$ and $l^2$, and the corresponding end of the passageway 77. During these operations, the piston within the other cylinder M is maintained in central position by the equalization of the pressure within both ends of the cylinder through the even distribution of pressure fluid therein, through the grooves 84 and 85 of the valve body 76. When it is desired to operate the piston within the lower cylinder, as above described, the position of the valve body is first reversed so that the groove 78 is in alinement with the tubes $l^{10}$ and $l^{20}$, and the adjacent end of the passageway 77. From this position the valve body may be swung in either direction, through 60°, whereby the shifting of the lower piston is accomplished.

An important feature in connection with this selecting valve is the fact that through it, the normal or central position of that piston which is not actually performing the operation, is maintained during the time that the other piston is being operated.

I also employ mechanical means for preventing the movement of one of the pistons from normal position, while the other is out of such position; and this means comprises the ball 95, which is contained within a cylindrical aperture 96, in the block 97, that projects from the bracket 98, between the opposed faces of the heads 63. The diameter of this ball is greater than the distance between the opposed faces of the aforesaid heads, and each of these heads is provided with a pocket 99, that registers with the aperture 96 when the heads are in normal position. The movement of one of the heads from normal position will cause it to confine the ball 95 within the pocket of the opposite head, whereby the other head will be locked against movement with respect to the block 97, the ball 95 forming, in effect, a key between said parts. This locking mechanism permits the shifting of gears from a position that is controlled through the lower cylinder, to one that is controlled through the upper cylinder, by one positioning or operation of the valve L, as heretofore described.

Figure 11:
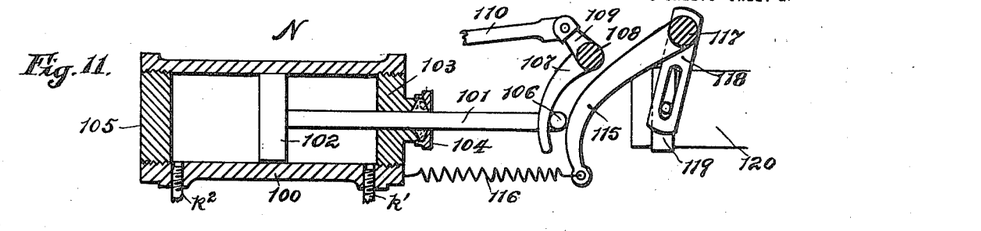
Fig. 11 is a longitudinal section through the brake and clutch operating cylinder.

In Fig. 11 I have shown the mechanism for actuating the service brakes and the clutch. The tube $k'$ leads to the forward end, and the tube $k^2$ leads to the rear end of a cylinder 100, the forward end being considered that through which the rod 101 of the piston 102 extends. The forward end of the cylinder is closed by a suitable head 103 having a packing gland 104 for the piston rod, and the opposite end of the cylinder is closed by a head 105. As a convenient means of illustrating the principle of this part of my invention, I have shown the forward end of the piston rod 101 as being provided with a T-head 106, as will appear from Fig. 1. The rear side of one end of the head 106 engages a curved arm 107 which depends from the rock shaft 108; and to the upper end of an arm 109, which rises from the shaft 108, is connected the forward end of a draw rod 110, which extends toward the rear of the automobile where it is connected to an arm 111 of a rock shaft 112 through which the service brakes of the automobile are operated in the usual manner. The service brakes may be that of any approved form, and are contained within the brake casings 113 which are carried by the rear driving wheels of the automobile. It will be seen, therefore, that when air is admitted to the forward end of the cylinder 100 through the tube $k'$, the piston 102 will be moved toward the rear end of the cylinder and the piston rod 101 retracted, whereupon the head 106 will draw rearwardly the arm 107 and rock the shaft 108 to draw forward on the rod 110 and to apply the service brakes of the automobile through the mechanism above referred to.

By the movement of the piston 102 toward the forward end of the cylinder 101, by the admission of air to the rear of the cylinder through the tube $k^2$, the head 106 is projected forwardly to rock the arm 115 against the tension of the spring 116, one end of which is connected to the lower end of the arm 115 and the opposite end to any convenient stationary part of the automobile, such as the cylinder 101. The arm 115 is rigid with the rock shaft 117, within which shaft is incorporated the shifting fork 118, which has connection, through the collar 119, with the clutch sleeve 120. Therefore, when the arm 115 is swung forward, the fork 118 will also be moved in the same direction to cause the driven clutch member P to be moved into engagement with the driving member P'.

Figure 14:
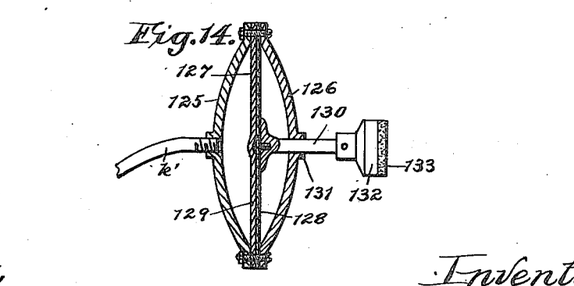
Fig. 14 is a sectional detail of the clutch-brake mechanism.

From this construction it will be seen that the engagement of the clutch members, without the previous releasing of the service brakes of the automobile, is impossible; furthermore, that the application of the service brakes, without having first released the clutch, is also impossible. In the performance of this last operation, to-wit, the application of the service brakes and the disengagement of the clutch members, attention is called to the fact that, because of the immense weight of the driven clutch member, and the various parts associated therewith (such as the driving shaft Q, the gearing within the box or casing R, and the shaft and other mechanism within the rear axle of the automobile), the inertia of these parts will be so great that undue strain will be thrown upon the gears and other mechanisms unless some means is provided for arresting the rotation of the driven clutch member P. For this purpose I provide the means illustrated in detail in Fig. 14, and referred to generally by the reference character O. In Fig. 14 I have shown in central section a diaphragm casing comprising the dish-shaped members 125 and 126 between the opposed edges of which is clamped the periphery of a composite diaphragm 127. This diaphragm may be composed of any suitable material, the one shown herein being formed of a thin plate of metal 128 that has a backing of some such material as leather, as shown at 129. To the metal plate 128 is secured a plunger 130, which is guided through a boss 131 that projects from the center of the casing member 126. The front end of the plunger 130 carries a head 132, that is faced with suitable friction material 133. The casing member 125 has connection with the discharge end of a branch of the tube $k'$, which extends beyond the cylinder N. The diaphragm mechanism O is located with respect to the clutch in such a way as to cause its head 132 to be projected against the rear face of the driven clutch member P, when the same is in inoperative position. Therefore, when the clutch is disengaged through the mechanism previously described, the driven clutch member will be moved toward the head 132, and at the same time, air will be admitted through the tube $k'$, to the rear side of the diaphragm 127 and cause it to move the head 132 into contact with the driven clutch member. This serves to arrest the rotation of the clutch member, and the parts associated with it, simultaneously with the application of the service brakes of the automobile, thereby relieving such parts of undue strain.

I will now describe the manner in which my control system is operated. Let it be assumed that the automobile is standing and that the storage tanks are charged with pressure fluid. The operator first turns the primary valve in the position to direct the pressure fluid to the compressed air motor J for starting the engine. The operator next depresses the foot lever W to its lowest position, thereby turning the distributer valve K so as to cause it (when the pressure fluid is subsequently turned into it) to direct the pressure fluid to the front end of the clutch and brake cylinder N. The primary valve is then turned after the engine is running into a position to cause it to direct the pressure fluid into the control system, or more definitely stated, through the tube $i'$ into the dome of the distributer valve K. This valve being in the position just above mentioned, the pressure fluid is conducted therethrough, and through the tube $k'$, to the cylinder N, and also to the diaphragm casing O. With the pressure fluid thus confined within the forward end of the cylinder N and within the diaphragm casing, the associated mechanisms are actuated to cause the service brakes, and the clutch brake, to be "set," and insures the disengagement of the clutch members. It may be stated at this time, that the clutch members are so adjusted with relation to each other that, when they are "disengaged" and the clutch brake is released, there is sufficient "drag" or engagement between the clutch members to cause the driven clutch member to be rotated gently through the influence of the driving clutch member which is being actively rotated by the engine, it being understood, of course, that the sliding gears, in the casing C, are in neutral position at such time. Now with the foot lever W still in its lowest position, and all parts but the engine, the parts operatively connected therewith, and the driven clutch member, perfectly quiet, the operator turns the selecting valve L, through the operating handle $l^3$ to a position to direct the pressure fluid, through said selecting valve, to the gear shifting cylinders M, the fluid being thus directed through the course required for the accomplishment of "first-speed-forward." With the selecting valve so positioned, the operator releases the foot lever W to allow the distributer valve K to return to its normal position, through the influence of the spring $w^4$. In its return, the distributer valve first cuts off the supply of pressure fluid to the forward end of the cylinder N and the diaphragm casing O, this resulting in the release of both service and clutch brakes, allowing, thereby, a free and gentle rotation of the driven clutch member through its slight frictional contact with the driving clutch member. Next, the distributer valve permits the pressure fluid to flow through the pipe $k$ to the selecting valve L, and therethrough to the gear shifting cylinders M. The movement imparted to the driving gears within the box or casing R, through the gentle rotation of the driven clutch member, assures the meshing of the sliding gears with those they are intended to drive, and this shifting may be accomplished as slowly as desired by a proper manipulation of the distributer valve K, as previously set forth. The foot lever W is now permitted to return to its highest, or what may be considered its normal position, and when it is in such position, communication has been established between the pressure fluid supply pipe which leads to the distributer valve K, and the tube $k^2$, thereby to direct the pressure fluid into the rear end of the cylinder N. Its accumulation therein will cause the piston to be moved toward the front end of the cylinder, thereby actuating the clutch operating mechanism to cause the positive engagement of the clutch members.

The entire operation of releasing the brakes, shifting the gears, and engaging the clutch, is accomplished by simply removing the foot from the lever W and permitting the spring $w^4$ to return the lever to its highest position. It may be stated at this time, that the action of the spring is retarded by having the foot lever W frictionally engage the brackets $w$ with sufficient degree of pressure to cause the return movement of the lever to be comparatively slow. Other approved means for retarding the return movement of the lever may of course be employed. As will be remembered, the distributer valve K is so constructed as to cause a proper sequence of the above operations; and the return of the foot lever is so retarded as to allow the correct interval of time between the different operations. In the case of coasting, the driver may depress the foot lever W to its intermediate position, under which circumstances the clutch is disengaged, the service brakes remain released, and the clutch brake is ineffective, thereby permitting the driven clutch member to rotate freely and independently of the driving member.

At his convenience, the operator shifts the operating handle $l^3$ to "second-speed-ahead" position, and when the automobile has attained its maximum speed through the "low-speed gearing," the operator presses the foot pedal W downward to its intermediate position, thereby first disengaging the clutch and then shifting the gears in a manner identical to that just above described in connection with the shifting of the gears for "first-speed." By the release of the foot lever W, the driver again throws in the clutch, and the automobile is driven through the "second-speed" gearing, until the driver sees fit to again shift the gears for "third-speed-ahead."

When the operator desires to stop his car, he may return the lever $l^3$ to normal position, which causes the selecting valve L to direct the pressure fluid to both ends of each of the gear shifting cylinders M. Now, by fully depressing the foot lever W, the clutch will be thrown out, the gears disengaged and left at neutral position, and the service brakes and the clutch brake will be applied. If desired, the driver, upon leaving the car, may turn the primary valve to intermediate position, and with suitable locking means (not shown) lock the valve in such position and thereby protect his automobile against being operated by unauthorized persons. It will be seen from the foregoing, that in the case of an emergency, the operator need only depress the foot lever W and the machine will be brought to a sudden stop, the clutch being thrown out of engagement and the brakes of the automobile being applied in very rapid succession. In such an emergency as this, the clutch brake is invaluable as it immediately arrests the rotation of the driven clutch member and saves the gears which, it will be remembered, are not yet thrown out, of the shock which would otherwise be imparted to them through the inertia of the heavy driven clutch member.

Ease, accuracy, safety, and speed of control are not the only important advantages of my invention. My control system establishes a definite relation between the various operations which are performed by it, thereby relieving the driving mechanisms of a great amount of undue strain to which they are invariably subjected, under the prevailing control systems, even by the most experienced drivers. I have observed that the clutch members are subjected to great wear due to the operator not entirely disengaging the members when shifting gears and applying brakes. With my system, each operation necessary for the control of the automobile can be performed, only after the operations which precede it have been fully completed.

For purposes of simplicity, the drawings herein are largely diagrammatic and conventional, and I wish it to be understood that I do not limit myself to the use of the particular means which I have shown in the drawings for operating the various mechanisms, further than required by the terms of the annexed claims, and the state of the prior art.

I wish to state, also, that I have found compressed air to be the most suitable medium for the shifting of gears of any that have been used for that purpose, or experimented with in that connection, with which I am familiar. Its elasticity makes it peculiarly adaptable to this purpose and much to be preferred to electricity for the shifting of gears; or even to the manually operated devices which are used almost entirely, at the present time.

Having thus described my invention, what I claim is:—

1. In a control system for automobiles, the combination, with a source of pressure fluid supply, of pressure fluid operated brake applying mechanism, clutch operating mechanism, and gear shifting mechanism, and a connection between the aforesaid source of pressure fluid supply and each of said mechanisms, that is independent of the connections between said supply and the other mechanisms.

2. In a control system for automobiles, the combination, with a source of pressure fluid supply, of pressure fluid operated brake applying mechanism, and pressure fluid actuated mechanism for holding the clutch members in engagement, and connections between said mechanisms and the said fluid supply whereby the brake mechanism may be operated to apply the brake only after the pressure fluid shall have been exhausted from the clutch engaging mechanism and the clutch members disengaged.

3. In a control system for automobiles, the combination, with a source of pressure fluid supply, of brake mechanism, clutch engaging mechanism, and connections between the pressure fluid supply and said mechanisms whereby the clutch engaging mechanism will be rendered ineffective and the clutch members disengaged and the brake mechanism operated and the brake applied in sequence.

4. In an automobile control system, the combination, with a source of pressure fluid supply, of service brake operating mechanism, clutch brake operating mechanism, and clutch operating mechanism, and connections between the source of pressure fluid supply and the aforesaid mechanisms whereby the clutch members will be disengaged and the service and clutch brakes will be applied in sequence.

5. In an automobile control system, the combination with a source of pressure fluid supply, of brake operating mechanism, clutch operating mechanism, communicative connections between the pressure fluid supply and said mechanisms, and means within said connections whereby the pressure fluid may be exhausted from the brake operating mechanism to release the brake, and admitted to the clutch operating mechanism to engage the clutch in sequence.

6. In an automobile control system, the combination of a source of pressure fluid supply, gear shifting mechanism, clutch operating mechanism, and brake operating mechanism, communicative connections between the source of pressure fluid supply and said mechanisms and means within said connections whereby the pressure fluid may be released from the brake operating mechanism to release the brake, delivered to the gear shifting mechanism to engage the gears, and admitted to the clutch operating mechanism to engage the clutch, and the clutch members engaged in sequence.

7. In an automobile control system, the combination of change-of-speed-gears, a source of pressure fluid supply, pressure fluid actuated mechanism for engaging and disengaging said gears, clutch engaging mechanism adapted to be actuated by pressure fluid, communicative connections between said mechanisms and the pressure fluid supply, and means within said connections whereby the pressure fluid may be exhausted from the clutch operating mechanism and the clutch thereby disengaged, and admitted to the first mentioned mechanism to shift the gears, in sequence.

8. In an automobile control system, the combination of change-of-speed-gears, a source of pressure fluid supply, pressure fluid actuated mechanism for engaging and disengaging said gears, clutch engaging mechanism adapted to be actuated by pressure fluid, communicative connections between the said mechanisms and the pressure fluid supply, and means within said connections whereby pressure fluid may be delivered to the first mentioned mechanism to engage the appropriate gears, and admitted to the clutch operating mechanism to engage the clutch members, in sequence.

9. In an automobile control system, the combination, with a source of pressure fluid supply of brake operating mechanism, gear shifting mechanism, and clutch operating mechanism, communicative connections between the pressure fluid supply and said mechanisms, and means within said connections whereby pressure fluid may be exhausted from the brake operating mechanism and the brakes released, delivered to the gear shifting mechanism and the gears engaged, and admitted to the clutch operating mechanism and the clutch members engaged in sequence.

10. In an automobile control system, the combination, with a source of pressure fluid supply, of brake operating mechanism, clutch operating mechanism, communicative connections between the source of pressure fluid and said mechanisms, and means within said connections whereby pressure fluid may be exhausted from the brake operating mechanism and release the brakes, and admitted to the clutch operating mechanism and engage the clutch in sequence.

11. In an automobile control system, the combination, with a source of pressure fluid supply, of gear shifting mechanism, clutch operating mechanism, and pressure fluid operated brake applying mechanism, and connections whereby the clutch and brake are released in advance of shifting the gears.

12. In an automobile control system, the combination, with a source of pressure fluid supply, of gear shifting mechanism, brake applying mechanism and clutch operating mechanism adapted to be operated by pressure fluid from such source, a controlling valve common to such mechanisms, and connections from said valve to said mechanisms whereby a certain sequence in the operation thereof is secured.

13. In an automobile control system, the combination of a brake operating mechanism and clutch operating mechanism, means including a cylinder and a piston for operating said mechanisms, means for supplying pressure fluid to opposite ends of said cylinder, a controlling valve for such pressure fluid, and connections whereby the movement of the piston in reverse directions will apply the brake and engage the clutch members.

14. In an automobile control system, the combination, with change-of-speed gears, of a source of pressure fluid supply, mechanism for shifting said gears to engage and disengage them and adapted to be operated by fluid from such source, a selecting valve interposed between such source and the gear shifting mechanism and adapted by its position to select any predetermined combination of gears, clutch operating mechanism adapted to be operated by fluid from such source, and a distributing valve for the fluid supplied to the selecting valve and to the clutch operating mechanism, and connections whereby said distributing valve will prevent the shifting of the gears by the first mentioned mechanism until after the release of the clutch members by the last mentioned mechanism.

15. In an automobile control system, the combination, with a source of pressure fluid supply, of engine starting mechanism and clutch operating mechanism, connections between the source of pressure fluid supply and said mechanisms, and a valve included in such connections whereby either one or the other of said mechanisms may be supplied with pressure fluid.

16. In an automobile control system, the combination, with a source of pressure fluid supply, of engine starting mechanism, gear shifting mechanism, brake controlling mechanism, and clutch controlling mechanism, connections whereby said mechanisms may be operated by fluid from the aforesaid source, and means for preventing the operation of both the engine starting mechanism, and the other mechanisms, at the same time.

17. In an automobile control system, the combination of a source of pressure fluid supply, pressure fluid operated gear engaging and disengaging mechanism, clutch operating mechanism, and pressure fluid operated brake applying mechanism, connections between the source of pressure fluid supply and said mechanisms whereby the brake will be released, the gears engaged, and the clutch members engaged in sequence, and means for controlling the intervals of time between the operations.

18. In mechanism of the character described, the combination, with a pair of gear actuating members, of a pair of cylinders, a piston reciprocable within each cylinder and normally reposing at substantially the center thereof, operative connections between each piston and one of the gear actuating members, a source of pressure fluid supply, and connections between said source and said cylinders whereby pressure fluid may be admitted to one end of one of the cylinders and the fluid in the opposite end of the same cylinder exhausted simultaneously with the admission of pressure fluid to both ends of the other cylinder.

19. In mechanism of the character described, the combination, with a pair of gear actuating members, of a pair of cylinders, a piston reciprocable within each cylinder and normally reposing at substantially the center thereof, each of the cylinders having ports which are normally covered by its respective piston, operative connections between each piston and one of the gear actuating members, a source of pressure fluid supply, and connections between said source and the cylinders whereby pressure fluid may be supplied to one end of one of the cylinders and the fluid within the opposite end of the same cylinder exhausted simultaneously with the admission of pressure fluid to both ends of the other cylinder, the pressure fluid within the receiving end of the first mentioned cylinder being exhausted when the piston has been moved to uncover one of the aforesaid ports.

20. In mechanism of the character described, the combination, with a pair of gear actuating members, of a pair of cylinders each having a pair of ports and an exhaust opening spaced longitudinally of the cylinder in each direction from one of said ports, a piston reciprocable within each cylinder and normally occupying a position to cover the exhaust openings, each piston being provided with a port for association with each of the ports of its respective cylinder, the relative size and arrangement of each of the piston ports with respect to the corresponding cylinder port being such as to cause the piston to close one of the cylinder ports when the piston is moved, and to permit constant communication between the other cylinder port and that end of the cylinder toward which the piston is moving, operative connections between each piston and one of the aforesaid gear actuating members, a source of pressure fluid supply, connections between said source and the cylinder ports, and means included in said connections whereby pressure fluid may be directed to one of the ports of one of the cylinders and both of the ports of the other cylinder, simultaneously.

21. In a control system for automobiles, the combination with a source of pressure fluid supply, of brake operating mechanism, clutch operating mechanism, and gear shifting mechanism, communicative connections between the aforesaid source of pressure fluid supply and the said mechanism, and means whereby the pressure fluid may be directed to any one of the three mechanisms and simultaneously exhausted from the other two mechanisms.

22. In an automobile control system, the combination of change-of-speed gears, a source of pressure fluid supply, pressure fluid operated mechanism, clutch operating mechanism for engaging and disengaging the gears, communicative connections between the source of pressure fluid supply and said mechanisms whereby said mechanisms may be caused to operate in sequence, and means for controlling the interval of time between the operations of the respective mechanisms.

23. In mechanism of the character described, the combination of a pair of cylinders, a piston reciprocable within each cylinder and normally reposing at substantially the center thereof, a source of pressure fluid supply, connections between said source and said cylinders whereby pressure fluid may be admitted to the cylinders thereby to reciprocate the aforesaid pistons, and means for preventing the movement of one of the pistons from normal position when the other piston is in any but normal position.

24. In mechanism of the character described, the combination, with a gear actuating member, of a cylinder, a piston reciprocable within said cylinder, operative connections between said piston and the gear actuating member, a source of pressure fluid supply, and communicative connections between said source and said cylinder whereby pressure fluid is adapted to be admitted to that end of the cylinder wherein the piston is, at the time, reposing and move said piston to middle position, the pressure fluid thereupon being admitted to the opposite end of the cylinder as well, thereby to balance the pressure on opposite sides of the piston.

25. In a control system for automobiles, the combination of an engine starting mechanism, mechanism for transmitting power from the engine to the driving wheels of the automobile, a source of energy from which each may receive an actuating current, and means common to both mechanisms whereby an actuating current may be conducted to one or the other of said mechanisms.

26. In a control system for automobiles, the combination of an engine starting mechanism, mechanism for transmitting power from the engine to the driving wheels of the automobile, a source of energy from which each may receive an actuating current, and means common to both mechanisms whereby an actuating current may be conducted to one or the other of said mechanisms or cut off from both.

27. In an automobile control system, the combination, with change-of-speed gears, of a source of pressure fluid supply, pressure fluid operated mechanism for engaging and disengaging the gears, clutch engaging mechanism adapted to be operated by pressure fluid from such source, controlling valve mechanism common to the aforesaid mechanisms, and connections from said valve mechanism to the other mechanisms, the valve mechanism acting, when operated, to produce a certain sequence in the operation of said other mechanisms.

28. In an automobile control system, the combination, with clutch elements, of a source of pressure fluid supply, pressure fluid actuated mechanism for operatively engaging the clutch elements, communicative connections between said source and said mechanism, and means included in said connections for delivering at will any desired quantity of pressure fluid to and for retaining such quantity in the said mechanism.

29. In an automobile control system, the combination, with a normally disengaged clutch and shiftable gears, of pressure fluid means for engaging said clutch, pressure fluid means for engaging and disengaging the gears, and connections whereby the gear engaging and disengaging means may be operated only when the clutch is in disengaged condition.

30. In an automobile control system, the combination, with a normally disengaged clutch and shiftable gears, of pressure fluid means for engaging said clutch, pressure fluid means for engaging and disengaging the gears, and connections whereby the clutch may be engaged only when the gear engaging and disengaging means is inactive.

In testimony whereof, I hereunto affix my signature in the presence of two witnesses.

ARTHUR L. PARKER.

Witnesses:
BRENNAN B. WEST,
HUGH B. MCGILL.